United States Patent [19]
Odagiri

[11] Patent Number: 5,964,349
[45] Date of Patent: Oct. 12, 1999

[54] CASSETTE, STORAGE CASE, AND LABEL TO BE APPLIED TO SUCH CASSETTE AND STORAGE CASE

[75] Inventor: Hirokazu Odagiri, Miyagi, Japan

[73] Assignee: Sony Corporation, Tokyo, Japan

[21] Appl. No.: 09/022,117

[22] Filed: Feb. 11, 1998

Related U.S. Application Data

[62] Division of application No. 08/519,001, Aug. 24, 1995, Pat. No. 5,725,169.

[30] Foreign Application Priority Data

Aug. 31, 1994 [JP] Japan ..................... 6-207724

[51] Int. Cl.⁶ .............. B65D 85/672; G09F 3/10
[52] U.S. Cl. ............... 206/387.1; 40/638; 206/459.5; 283/901
[58] Field of Search ............... 206/387.1, 459.5; 40/638; 283/901

[56] References Cited

U.S. PATENT DOCUMENTS

| | | | |
|---|---|---|---|
| 4,501,359 | 2/1985 | Yoshizawa | 206/387.1 |
| 4,724,309 | 2/1988 | Greene | 283/901 X |
| 5,279,058 | 1/1994 | Kohn | 40/638 |
| 5,413,218 | 5/1995 | Shimokuni et al. | 206/387.1 |

*Primary Examiner*—Bryon P. Gehman
*Attorney, Agent, or Firm*—Ronald P. Kananen; Radner, Fishman & Grauer

[57] ABSTRACT

A cassette storing a recording medium therein and having an opening for recording information on and/or reproducing information from the recording medium therethrough, or a storage case for storing such a cassette has, on its outer surface, a label area made of a phosphorescent material for allowing information to be written with a writing instrument.

4 Claims, 4 Drawing Sheets

CASSETTE, STORAGE CASE, AND LABEL TO BE APPLIED TO SUCH CASSETTE AND STORAGE CASE

This application is a divisional of application Ser. No.: 08/519,001, filed Aug. 24, 1995, now U.S. Pat. No. 5,725,169.

BACKGROUND OF THE INVENTION

The present invention relates to a cassette, a storage case, and a label to be applied to such a cassette or storage case, and more particularly to a cassette for storing a recording medium therein, a storage case for such a cassette, and a label which can be applied to such a cassette or storage case.

Tape cassettes as cassettes which store recording mediums are presently used in a variety of applications. Audio compact cassettes, in particular, are in widespread use.

Many users of audio compact cassettes use them on car stereo sets mounted in automobiles. When a user of audio compact cassettes looks for a desired audio compact cassette in an automobile at night, the user usually finds it necessary to illuminate audio compact cassettes with external light from outside of the automobile or turn on a lamp in the passenger's compartment to read labels on the audio compact cassettes because the user cannot make out titles or other letters on the labels in the dark.

However, it is highly dangerous for the user to illuminate audio compact cassettes with external light from outside of the automobile or turn on the lamp in the passenger's compartment to read the labels while the user is driving the automobile.

SUMMARY OF THE INVENTION

It is therefore an object of the present invention to provide a cassette which resolves the above-mentioned problems.

It is another object of the present invention to provide a storage case which resolves the above-mentioned problems.

It is a further object of the present invention to provide a label which resolves the above-mentioned problems.

According to the present invention, there is provided a cassette comprising a cassette housing and an indicator for indicating information to the user of the cassette. The cassette housing stores a recording medium therein. The indicator is disposed on an outer surface of said cassette housing. The indicator is made of a material capable of emitting absorbed energy as light.

According to the present invention, there is also provided a cassette comprising a cassette housing and a label area. The cassette housing stores a recording medium therein and has an opening for recording information on and/or reproducing information from said recording medium therethrough. The label area is formed of a phosphorescent material on an outer surface of said cassette housing.

According to the present invention, there is also provided a storage case comprising a case assembly and an indicator for indicating information to the user of the cassette. The case assembly serves to store therein a cassette with a recording medium stored therein. The indicator is disposed on an outer surface of said cassette assembly. The indicator is made of a material capable of emitting absorbed energy as light.

According to the present invention, there is further provided a label for being applied to an outer surface of a cassette with a recording medium stored therein or a storage case for storing a cassette. The label comprises a base, an adhesive layer, and a light-emitting layer. The label is disposed on one surface of said base. The light-emitting layer is disposed on another surface of said base and made of a phosphorescent material.

Since the indicator disposed on the cassette with the recording medium stored therein or the storage case for indicating information to the user of the cassette emits light, the user can easily select the cassette or the storage case in the dark.

DETAILED DESCRIPTION OF THE PREFERRED EMBODIMENTS

A cassette, a storage case, and a label to be applied to them, according to embodiments of the present invention, will be described below with reference to the drawings.

A cassette according to the present invention is a cassette for storing a recording medium. A tape cassette in which a tape-like magnetic recording medium is stored will be described below as an example of such a cassette. A storage case according to the present invention is a storage case for storing such a cassette. A cassette storage case for storing a tape cassette will be described below as an example of such a storage case.

Figure 1:
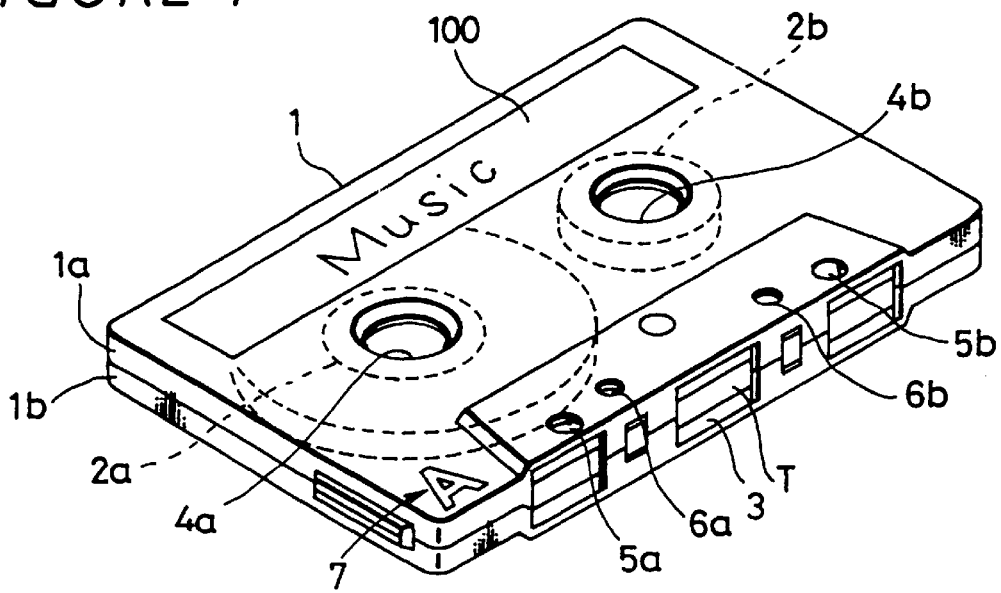
FIG. 1 is a perspective view of a cassette according to the present invention.

FIG. 1 illustrates a tape cassette for use as an audio compact cassette.

As shown in FIG. 1, the tape cassette, generally denoted at 1, comprises a cassette housing composed of a pair of upper and lower cassette shells 1a, 1b molded of HI-PS (high-impact polystyrene) which are fixed to each other by screws or fusion. The tape cassette 1 also includes a pair of hubs 2a, 2b rotatably disposed in the cassette shells 1a, 1b, and a magnetic tape T wound as a recording medium around the hubs 2a, 2b. The tape cassette 1 has a front opening 3 defined in a front side thereof for exposing the magnetic tape T which is unreeled from and extends between the hubs 2a, 2b. The tape cassette 1 also has a pair of hub drive shaft insertion holes 4a, 4b, a pair of capstan insertion holes 5a, 5b, and a pair of positioning holes 6a, 6b, all defined through the cassette shells 1a, 1b.

A label area 100 in the shape of an elongate strip for carrying visual information for the user of the tape cassette 1 is formed in a certain region of the surface of the tape cassette 1, e.g., the surface of the upper cassette shell 1a, behind the hub drive shaft insertion holes 4a, 4b. Although not shown in FIG. 1, a similar label area is formed on the surface of the lower cassette shell 1b.

The label area 100 is inscribable with any of various writing instruments including a pen using an oil-base ink, a pen using a water-base ink, a mechanical pen, a pencil, etc. to record visual information representing letters and numbers which indicate information regarding pieces of music such as music titles and other information recorded on the magnetic tape T.

The label area 100 is produced by printing the region of the outer surface of each of the cassette shells 1a, 1b with a phosphorescent material such as a luminous ink, for example. The luminous ink comprises an ink base composed of a general ink for use in plastic printing and mixed with a luminous material.

The luminous material which may be used is preferably a highly luminous material that emits light for a long period of time after having absorbed energy over a short period of time. One of the most preferable luminous materials available is a long-afterglow fluorescent substance "N night-glow" (manufactured by Nemoto Tokushu Chemicals).

The long-afterglow fluorescent substance "N night-glow" is prepared by firing a mixture of highly pure alumina and a rare-earth element at a temperature of about 1300° C.

The long-afterglow fluorescent substance "N night-glow" is a luminous material which can maintain a visually perceptible level of luminous emittance for eight hours or longer after a single process of absorbing energy. Since this luminous material does not contain any radioactive material, it can be used safely from the standpoint of environmental protection.

The proportion of the luminous material in the luminous ink is generally of about 20% by weight.

The luminous ink is mixed with suitable amounts of calcium carbonate and protein powder for making the label area 100 inscribable.

Specifically, the addition of calcium carbonate to the luminous ink makes the surface of the label area 100 rough or irregular to allow a writing instrument such as a pen using an oil-base ink, a mechanical pen, or a pencil to write on the label area 100 as it does on paper. When protein powder is added to the luminous ink, the hydrophilic group of the protein powder renders the label area 100 well inscribable with a pen using a water-base ink as the water-base ink applied to the label area 100 is not repelled.

The luminous ink may be printed on each of the cassette shells 1a, 1b by an existing printing process such as pad printing, screen printing, or the like.

Figure 2:
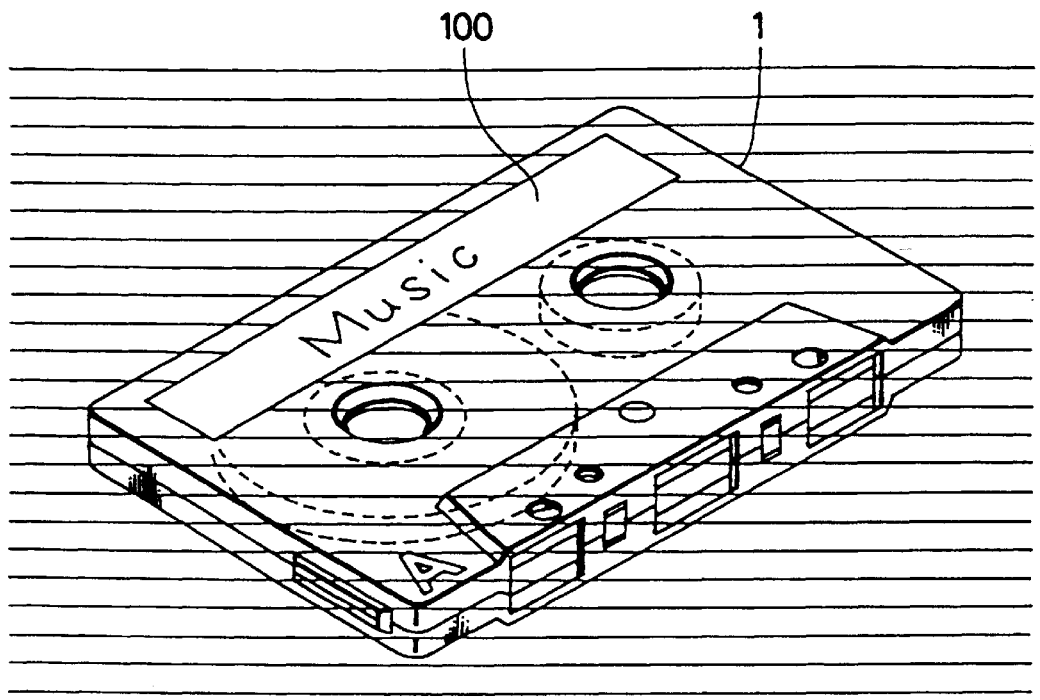
FIG. 2 is a perspective view showing the manner in which a label area of the cassette emits light in the dark.

When it gets dark around the tape cassette 1 with the label area 100 formed on each of the cassette shells 1a, 1b, the label area 100 emits light in the dark, making written letters indicating music titles or the like visually recognizable as shown in FIG. 2. Therefore, the user can easily look for a desired tape cassette from among a plurality of tape cassettes at night.

The luminous emittance of the label area 100 is higher as the thickness of the printed layer of label area 100 is greater. Therefore, each of the cassette shells 1a, 1b has a recess defined in its surface which is complementary in shape to the label area 100 to be printed and which receives the printed label area 100, the recess being deep enough to accommodate the thickness of the printed label area 100.

A logotype printed on each of the cassette shells 1a, 1b and marks 7 (FIG. 1) indicative of sides A, B of the tape cassette 1 may also be printed with a luminous ink, so that the logotype and the marks 7 can emit light for visual perception in the dark.

Figure 3:
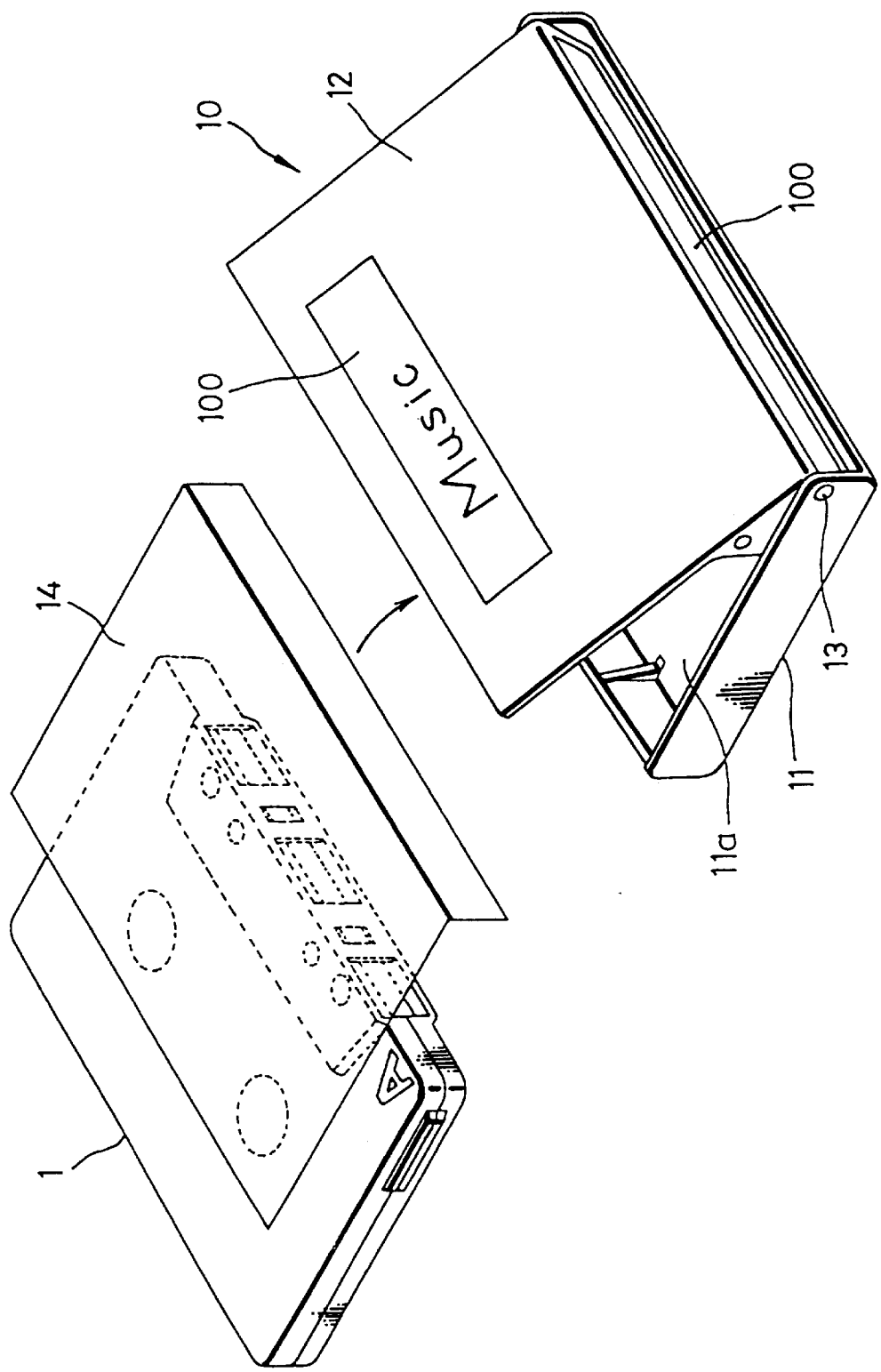
FIG. 3. is a perspective view of a storage case according to the present invention, for storing a cassette therein.

FIG. 3 shows a cassette storage case for storing the tape cassette 1 therein.

As shown in FIG. 3, the cassette storage case, generally denoted at 10, comprises a case assembly composed of a case housing 11 and a lid 12 both molded of a transparent synthetic resin such as PS (polystyrene), for example. The lid 12 is pivotally coupled to the case housing 11 by pivot pins 13 such that the case housing 11 can be opened and closed by the lid 12. When the tape cassette 1 is not used, the tape cassette 1 is placed into a storage space 11a in the case housing 11, and the case housing 11 is closed by the lid 12, thus storing the tape cassette 1 in the cassette storage case 10. With the tape cassette 1 stored in the cassette storage case 10, the magnetic tape T exposed in the front opening 3 of the tape cassette 1 is protected from dust and damage.

Since the case housing 11 and the lid 12 are molded of a transparent synthetic resin, the user can visually confirm the tape cassette 1 that is stored in the cassette storage case 10. An index card 14 is inserted together with the tape cassette 1 into the cassette storage case 10. The index card 14 is used to indicate music titles, etc. of music information recorded in the tape cassette 1.

Label areas 100 in the shape of elongate strips which are inscribable are printed, in the same manner as with the tape cassette 1, in certain regions of surfaces of the cassette storage case 10, i.e., upper and back surfaces of the lid 12 as shown in FIG. 3.

The label areas 100 on the cassette storage case 10 are made of the same materials and printed in the same manner as the label area 100 on the tape cassette 1 shown in FIG. 1. The label areas 100 on the cassette storage case 10 are printed in recesses defined in the respective surfaces of the lid 12.

Figure 4:
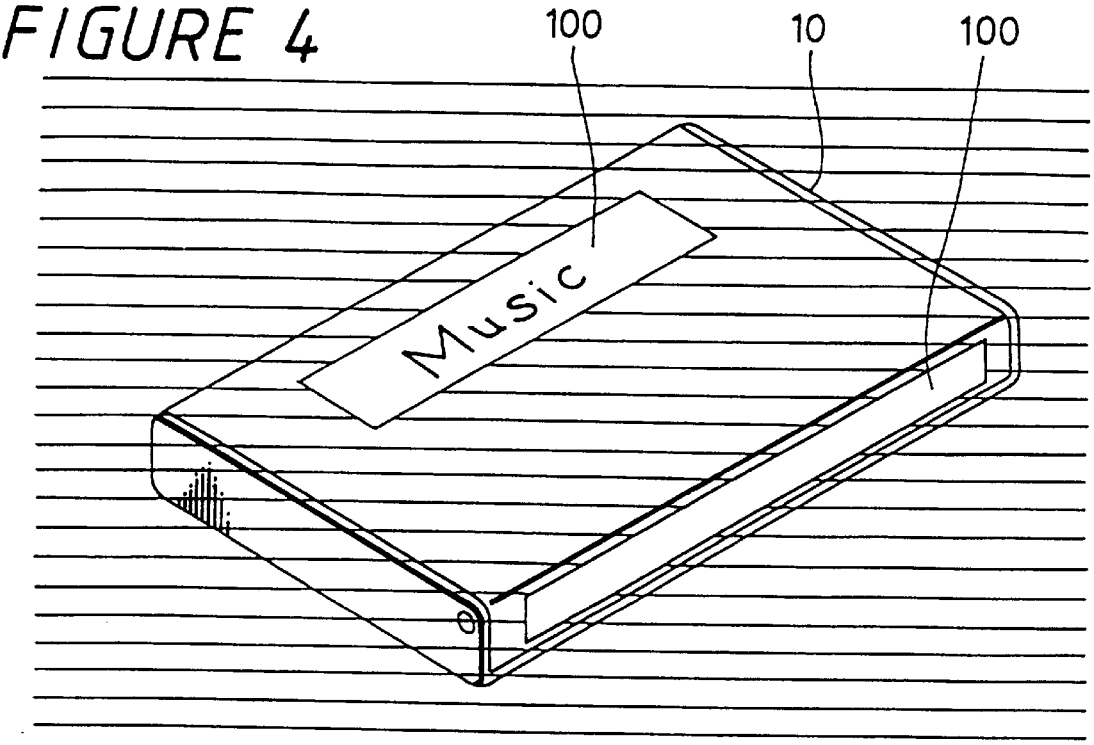
FIG. 4 is a perspective view showing the manner in which a label area of the storage case emits light in the dark.

When it gets dark around the cassette storage case 10 with the label areas 100 formed thereon, the label areas 100 emit light in the dark, making written letters indicating music titles or the like visually recognizable as shown in FIG. 4. Therefore, the user can easily look for a desired tape cassette from among a plurality of tape cassettes at night. If marks 7 (see FIG. 1) indicative of sides A, B of the tape cassette 1 are printed with a luminous ink, then they can indicate the sides A, B of the tape cassette 1 to the user even when the tape cassette 1 is housed in the cassette storage case 10.

The index card 14 inserted into the cassette storage case 10 may be coated or printed with the luminous material described above, so that the index card 14 can emit light. If music titles or other information is written on the index card 14, then the written letters can be visually perceived through the cassette storage case 10 in the dark.

Figure 5:
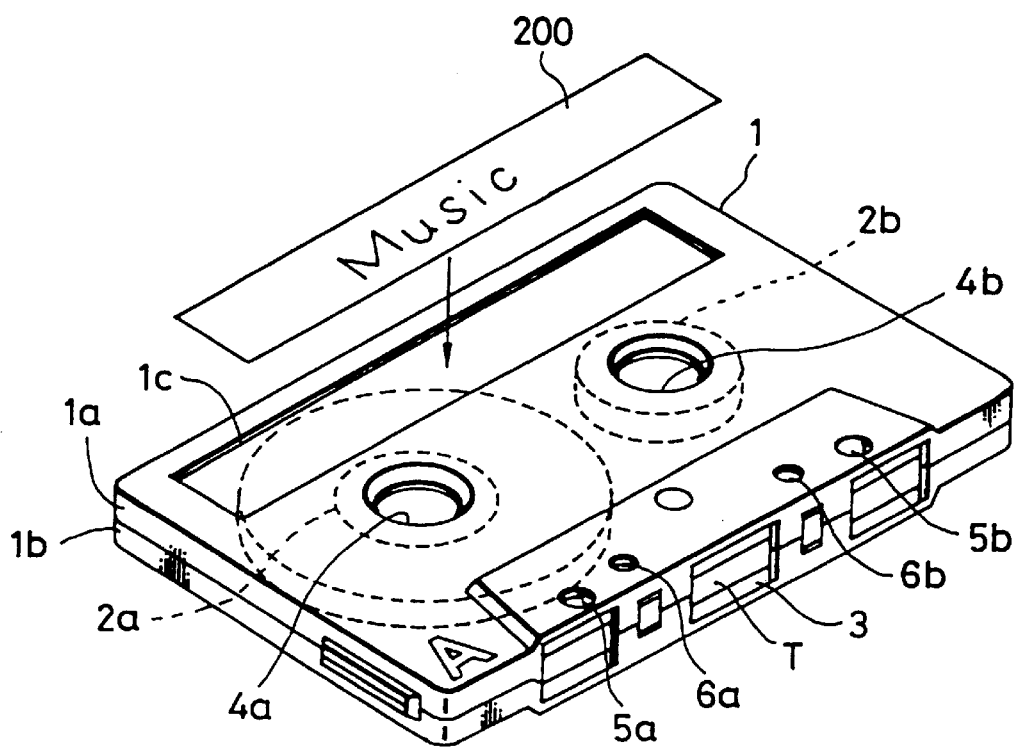
FIG. 5 is a perspective view showing the manner in which a label according to the present invention is applied to a cassette.
Figure 6:
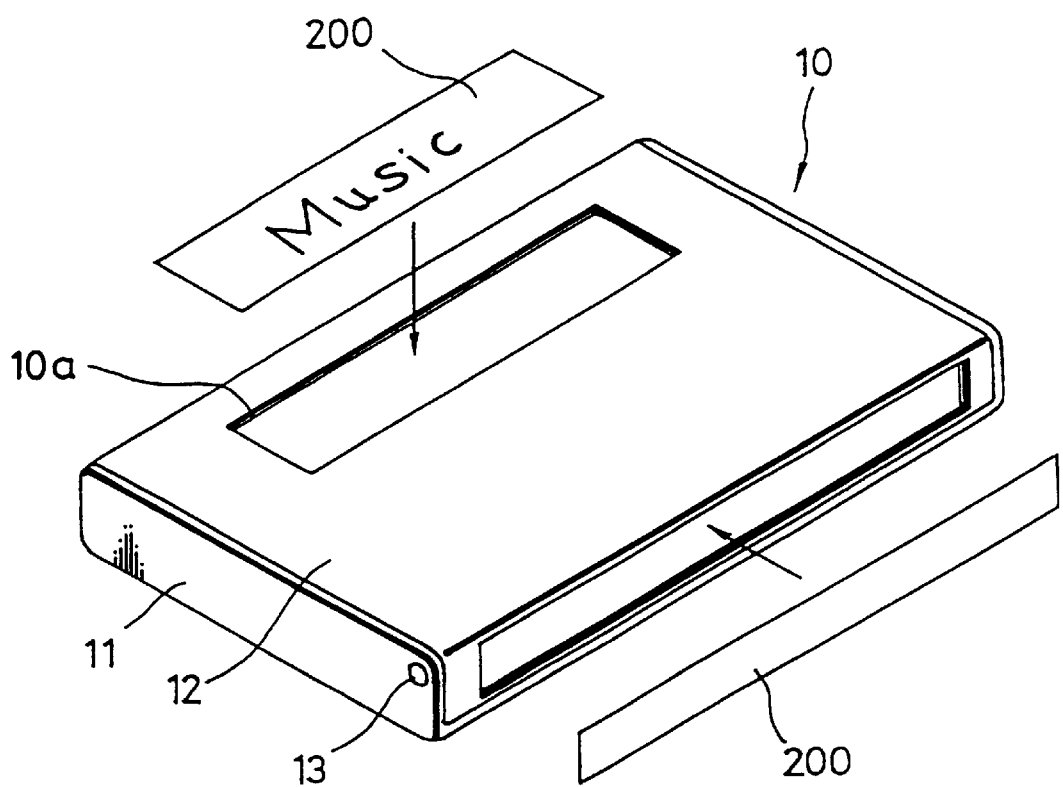
FIG. 6 is a perspective view showing the manner in which labels according to the present invention are applied to a storage case.

FIGS. 5 and 6 show labels 200 capable of emitting light, which are applied to a tape cassette 1 and a cassette storage case 10.

In FIGS. 5 and 6, recesses 1c, 10a are defined respectively in regions of a tape cassette 1 and a cassette storage case 10 where the label areas 100 would be printed in the embodiments shown in FIGS. 1 and 3. Labels 200 in the shape of elongate strips which are capable of emitting light are fitted in the respective recesses 1c, 10a.

The labels 200 are each made of a piece of paper which is coated on its back with an adhesive layer for applying the labels 200 to the tape cassette 1 and the cassette storage case 10. The labels 200 are also coated or printed on their face sides with a light-emitting layer made of a luminous material of the type described above, so as to be capable of emitting light. As with the label areas 100, music titles or other information can be written on the luminous face sides of the labels 200 with any of various writing instruments. The labels 200 have a generally acceptable level of inscribableness since they are made of paper.

When it gets dark around the tape cassette 1 and the cassette storage case 10 with the labels 200 applied thereto, the labels 200 emit light in the dark, making written letters indicating music titles or the like visually recognizable in the same manner as shown in FIGS. 2 and 4. Therefore, the user can easily look for a desired tape cassette from among a plurality of tape cassettes at night.

While the audio compact cassette and the cassette storage case therefor have been described in the above embodiments, the principles of the present invention are also applicable to other tape cassettes including a video tape cassette and a DAT cassette, disk cartridges for storing a 3.5" microfloppy disk, an optical disk, etc., and storage cases for storing those tape cassettes and disk cartridges.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A storage case comprising:

a case assembly for storing therein a cassette with a recording medium stored therein; and means disposed on an outer surface of said case assembly, for indicating information to the user of the cassette, said means being made of an ink material capable of emitting absorbed energy as light, said ink material being directly applied to said case assembly.

2. A storage case according to claim 1, wherein said case assembly comprises a case housing and a lid pivotally coupled to said case housing for selectively opening and closing an opening in said case housing, said means being disposed on at least one of outer surfaces of said case housing and said lid.

3. A storage case according to claim 1, wherein said means is made of a phosphorescent ink material.

4. A storage case according to claim 1, wherein said means is made of a phosphorescent and inscribable ink material.

\* \* \* \* \*